(12) United States Patent
Lui et al.

(10) Patent No.: US 8,364,020 B2
(45) Date of Patent: Jan. 29, 2013

(54) SOLUTION FOR CAPTURING AND PRESENTING USER-CREATED TEXTUAL ANNOTATIONS SYNCHRONOUSLY WHILE PLAYING A VIDEO RECORDING

(75) Inventors: Alfred Ying Fai Lui, Chicago, IL (US); David M. Burns, Chicago, IL (US); Alan Tan, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1422 days.

(21) Appl. No.: 11/864,178

(22) Filed: Sep. 28, 2007

(65) Prior Publication Data

US 2009/0087160 A1    Apr. 2, 2009

(51) Int. Cl.
*G11B 27/00* (2006.01)
*H04N 5/93* (2006.01)

(52) U.S. Cl. ........ 386/278; 386/280; 386/282; 386/286; 386/290

(58) Field of Classification Search ............... 386/278, 386/280, 282, 286, 290
See application file for complete search history.

(56) References Cited

U.S. PATENT DOCUMENTS

| | | | | |
|---|---|---|---|---|
| 5,600,775 A * | 2/1997 | King et al. | ............ | 715/203 |
| 5,867,177 A * | 2/1999 | Okuyama et al. | ............ | 345/473 |
| 2002/0089519 A1 | 7/2002 | Betz et al. | | |
| 2002/0194197 A1 | 12/2002 | Flank | | |
| 2004/0021685 A1 | 2/2004 | Denoue et al. | | |
| 2004/0068758 A1 | 4/2004 | Daily et al. | | |
| 2006/0062430 A1 * | 3/2006 | Vallone et al. | ............ | 382/103 |
| 2007/0136240 A1 * | 6/2007 | Wang et al. | ............ | 707/3 |
| 2008/0112683 A1 * | 5/2008 | Lin et al. | ............ | 386/52 |
| 2008/0138034 A1 * | 6/2008 | Hiroi et al. | ............ | 386/95 |
| 2008/0154908 A1 * | 6/2008 | Datar et al. | ............ | 707/10 |

FOREIGN PATENT DOCUMENTS

| | | |
|---|---|---|
| WO | 9945702 A | 9/1999 |
| WO | 03019418 A | 3/2003 |

OTHER PUBLICATIONS

Lin, C. Y., et al., "Video Collaborative Annotation Forum: Establishing Ground-Truth Labels on Large Multimedia Datasets," [online] TRECVID 2003 Workshop Notebook Papers, Nov. 18-21, 2003, retrieved from the Internet: <<http://www.alphaworks.ibm.com/tech/videoannex>>.

"ITP Research>>Video Comments, a WordPress Plugin," Interactive Telecommunications Program, NYU, 2005.

* cited by examiner

*Primary Examiner* — Daquan Zhao (57) ABSTRACT

The present invention discloses a textual annotation system for video recordings. Such a system can include a video recording, an annotation interface, and an annotation manager. The annotation interface can be configured to accept and execute a set of user-selectable commands for creating, modifying, and transmitting a user-created annotation set. The user-created annotation set can contains multiple textual annotations with associated placement data. The annotation manager can be configured to display the user-created annotation set synchronously with the video recording such that the contents of the video recording are unaltered.

18 Claims, 4 Drawing Sheets

SOLUTION FOR CAPTURING AND PRESENTING USER-CREATED TEXTUAL ANNOTATIONS SYNCHRONOUSLY WHILE PLAYING A VIDEO RECORDING

BACKGROUND

1. Field of the Invention

The present invention relates to video presentation and, more particularly, to presenting user-created textual annotations synchronously with the playing of a video recording.

2. Description of the Related Art

The Internet has been an instrumental tool for the development of online communities. Members of these communities typically share their knowledge and thoughts about a particular interest. This sharing is often in the form of static textual annotations. For example, many Web sites that offer a repository of cooking recipes allow for users to rate the recipes and post a review of their experience using the recipe.

While static annotating is satisfactory for many subjects, it lacks accessibility and synchronicity in regards to video recordings. A user must be able to read the annotations while viewing the video, which divides the user's attention and decreases their viewing experience. Furthers it can be difficult to put a static annotation in the proper context of the video. For example, a note stating that a character's shoe is untied is meaningless without information regarding where in the video this note is relevant. Even with a scene description, relating a static annotation to a corresponding point in the video can still be problematic.

Often, multiple applications and/or windows must be used in order for a user to access both the video and annotations, which can detrimentally affect the performance of the viewing device. This is of particular concern for resource-constrained devices, such as mobile phones and personal data assistants, which are becoming a popular choice for portable Internet connectivity.

What is needed is a solution that allows users to create and view textual annotations while playing a video recording. That is, a user can annotate a video at the scenes where their annotation applies and have the annotation displayed with the video. Ideally, a user can share their set of annotations about a video recording in an online community setting, where other users can view and rate their annotations.

SUMMARY OF THE INVENTION

The present invention discloses a solution that synchronously presents user-created textual annotations as well as captures user-created annotations while playing a video recording. That is, a set of user-created textual annotations can be displayed synchronously in the same viewing space as a video recording. Further, a user can invoke an annotation interface when playing a video recording in order to enter a textual annotation for display. These annotation sets can then be shared with other users in an online community where users can rate the quality of the annotations.

The present invention can be implemented in accordance with numerous aspects consistent with material presented herein. For example, one aspect of the present invention can include a textual annotation system for video recordings. Such a system can include a video recording, an annotation interface, and an annotation manager. The annotation interface can be configured to accept and execute a set of user-selectable commands for creating, modifying, and transmitting a user-created annotation set. The user-created annotation set can contain multiple textual annotations with associated placement data. The annotation manager can be configured to display the user-created annotation set synchronously with the video recording such that the contents of the video recording are unaltered.

Another aspect of the present invention can include a method for presenting user-created textual annotations while playing a video recording. Such a method can begin with the receipt of user selections of a video recording and a user-created annotation set. Next, a user request can be received instructing the system to apply the annotation set to the video recording. The contents of the user-created annotation set can then be synchronously displayed with the video recording.

Still another aspect of the present invention can include an online community that provides user-created textual annotations for video recordings. The online community can include a video annotation server and a video annotation application. The video annotation server can be configured to provide access to a data store that contains a multitude of user-created annotation sets and user-created video recordings. The video annotation application can be configured to create, modify, view, an convey user-created annotation sets.

It should be noted that various aspects of the invention can be implemented as a program for controlling computing equipment to implement the functions described herein, or a program for enabling computing equipment to perform process corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
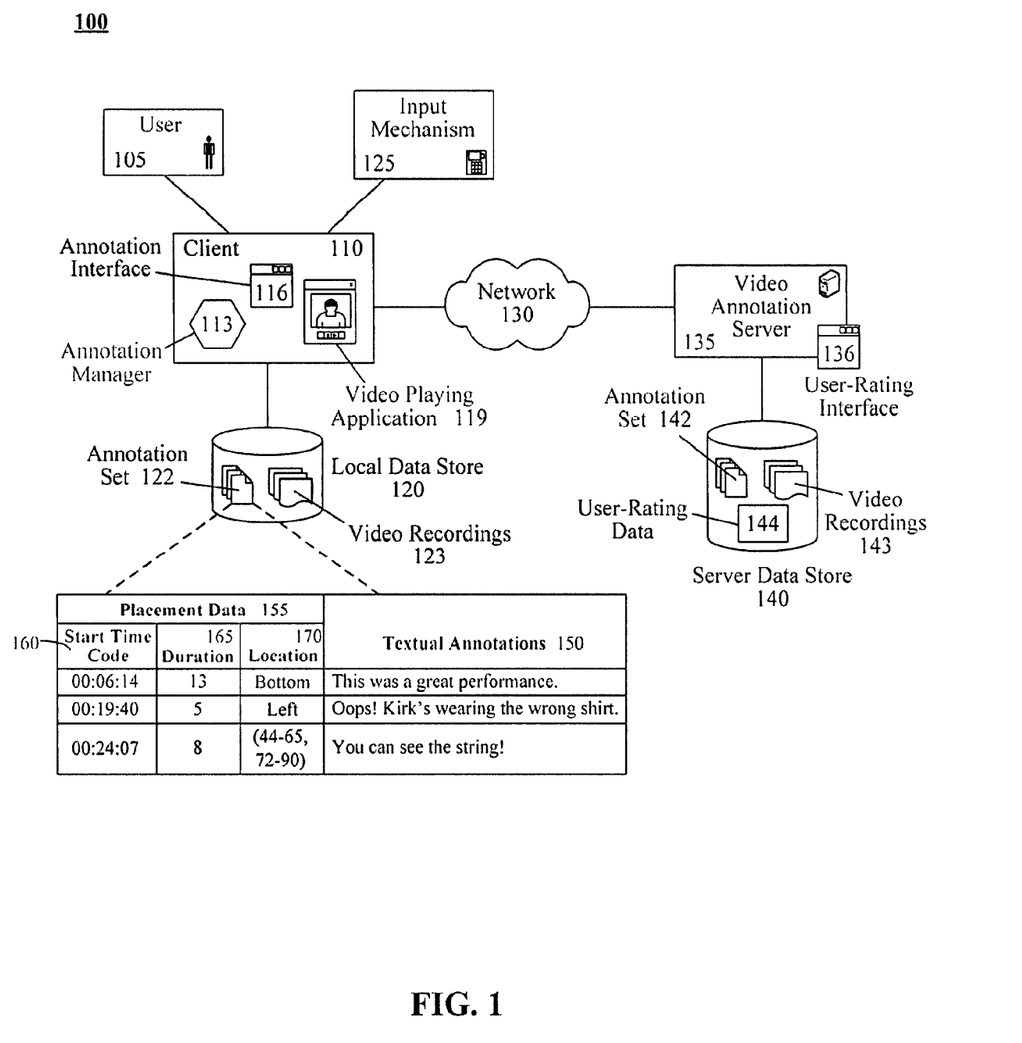
FIG. 1 is a schematic diagram of a system for capturing and presenting user-created textual annotations while playing a video recording in accordance with the arrangements and instrumentalities shown.

FIG. 1 is a schematic diagram of a system 100 for capturing and presenting user-created textual annotations while playing a video recording in accordance with the inventive arrangements disclosed herein. In system 100, a user 105 can use the annotation manager 113, annotation interface 116, and video playing application 119 of a client 110 to capture and view textual annotations for a video recording 123.

The client 110 can be a computing device capable of communicating with a video annotation server 135 over a network 130. The client 110 can be a variety of devices, including, but not limited to, a personal computer, a laptop computer, a mobile phone, a personal data assistant (PDA), a kiosk, and the like. Client 110 can contain and/or access a local data store 120 that can contain annotation set data 122 and/or video recording 123.

The user 105 can utilize a video playing application 119 to play a video recording 123. The video playing application 119 can represent a software application that can render a video recording in a viewing space. Alternately, the user 105 can access a video recording 143 located in a remotely-located data store 140 over a network 130 to play in the video playing application 119 of the client 110. Further, the remotely-located video recording 143 can be saved into the local data store 120 of the client 110 for viewing.

The video recording 123 can be an electronic format of a movie and/or animation. It is important to note that both the local data store 120 and video playing application 119 must be compatible with the format of the video recording 123. For example, a FLASH video recording 123 cannot be played in a third generation (3G) video playing 119 on a third generation mobile device.

While playing the video recording 123, the user 105 can access the annotation interface 116 in order to add textual annotations 150 to the video recording 123. Access to the annotation interface 116 can be provided in a variety of ways, including, but not limited to, a menu option, a hyperlink, a window tab, and the like. The textual annotations 150 can be grouped together and stored as an annotation set 122 in the local data store 120. In an alternate embodiment, the annotation sets 122 and video recordings 123 can be stored in separate data stores (not shown) that can be accessed by the client 110.

It is important to emphasize that the annotation sets 122 described herein are user-created data items and are not a part of a commercial product, such as a director's commentary that is often included on a movie DVD. Unlike the a static feature of a commercial product, this system 100 allows the user 105 to dynamically interact with the contents of an annotation set 122 without altering the contents of the video recording 123. That is, the contents of the annotation set 122 can be synchronously and dynamically layered onto the presentation of the video recording 123 in real-time.

The annotation set 122 can be a data file or a portion of a data file that is associated with and contains annotation data for a video recording 123. The annotation set 122 can also include placement data 155 for each textual annotation 150. Placement data 150 can define information about when and where the textual annotation 150 can be displayed in the video playing 119. The placement data 155 cab include data elements defining a start time code 160, a duration 165, and a location 170.

It should be noted that the values shown for placement data 155 and textual annotations 150 are for illustrative purposes only and are not to be construed as an absolute representation or implementation of the present invention.

The start time code 160 can represent a time value at which the associated textual annotations 150 should be displayed in the video playing application 119. The start time code 160 can correspond to a time code of a frame contained within the video recording 123.

The duration 165 can represent an amount of time that the textual annotation 150 should be displayed in the video playing application 119. In this example, the duration 165 values represent the number of seconds to display the textual annotation 150. Alternately, the duration 165 can be expressed as a time code value at which to terminate the display of the textual annotation 150.

The location 170 can define a region of the viewing area of the video playing application 119 where the textual annotation 150 can be displayed. As shown in this example, the location 170 can be represented as a relative placement in the viewing area, such as "Button" or "Left", and/or a coordinate pair range defining the boundaries for the region.

It is important to stress the text-only nature of the annotation set 122. The annotation set 122 does not contain any audio or graphic elements that can increase the size and decrease client 110 performance. This format can increase the viability of such a system 100 for use with clients 110 operating in a resource-constrained environment, such as a video-enabled mobile phone with limited bandwidth.

The data of the annotation set 122 can be entered by the user 105 via an input mechanism 125. The input mechanism 125 can be a hardware and/or software components that can allow the user 105 to enter data into the annotation interface 116. Input mechanisms 125 can include, but are not limited to, a mouse, a keyboard, a keypad, a microphone and voice recognition software, a stylus and touch screen, and the like.

It should be noted that more than one input mechanism 125 can be available to the client 110 and that the type of input mechanism 125 used must be usable by the client 110 and be able to communicate with the annotation interface 116.

The annotation interface 116 can be a user interface of a software application that allows a user 105 to execute a variety of commands for the creation, modification, and transmission of annotation set 122 data. Commands supported by the annotation interface 116 can include, but is not limited to, adding data for a new textual annotation, modifying data for an existing textual annotation, deleting an existing textual annotation, saving data for a new or modified textual annotation, creating a new annotation set, saving a new or modified annotation set, uploading an annotation set, downloading an annotation set, and the like.

In another embodiment, the annotation interface 116 can also include the video playing application 119. It should be appreciated that such an embodiment can be optimal for resource-constrained runtime environments, such as mobile phones, because it can reduce the processing overhead for the client 110.

After a user 105 has added a textual annotation 150 to the annotation set 122 for the video recording, the annotation manager 113 can display the textual annotation 150 in the viewing space of the video playing application 119. The annotation manager 119 can be a software application used by the annotation interface 116 to synchronously display the textual annotations 150 of an annotation set 122 in the viewing space of a video playing application 119. The annotation manager 119 can display the textual annotation 150 according to the associated placement data 155.

Alternately, the user 105 can use the components of system 100 to view an existing user-created annotation set 122 while playing a video recording 123. To do so, the user 105 can select a video recording 123 to play in the video playing application 119. Then, the user 105 can invoke the annotation interface 116 to select an annotation set 122 to apply to the video recording 123. Alternately, the user 105 can use the annotation interface 116 to obtain an annotation set 142 from a data store 140 of a remotely-located video annotation server 135.

Once an application 123 is selected, the annotation interface 116 can invoke the annotation manager 113 to synchronously display the annotation set 122 in the video playing application 119. During the viewing of the annotation set 122, the user 105 can use the annotation interface 116 to modify a textual annotation 150 and/or its associated placement data 155.

A user 105 can utilize the annotation interface 116 to transfer annotation sets 122 and/or video recordings 123 from the local data store 120 to and/or from the data store 140 of a remotely-located video annotation server 135. The video annotation server 135 can be a computing device accessible over a network 130 for the purpose of providing access to an associated server data store 140.

The video annotation server 135 can also include a user-rating interface 136 that can include a mechanism to collect user-rating data 144 about annotation sets 142 from users 105. The user-rating interface 136 can calculate an average user-rating from the collected user-rating data 144 that can be displayed when a user 105 is selecting an annotation set 142. The user-rating data 144 can be stored in the server data store 140.

As used herein, presented data stores, including stores 120 and 140, can be a physical or virtual storage space configured to store digital information. Data stores 120 and 140 can be physically implemented within any type of hardware including, but not limited to, a magnetic disk, an optical disk, a semiconductor memory, a digitally encoded plastic memory, a holographic memory, or any other recording medium. Each of the data stores 120 and 140 can be a stand-alone storage unit as well as a storage unit formed from a plurality of physical devices. Additionally, information can be stored within data stores 120 and 140 in a variety of manners. For example, information can be stored within a database structure or can be stored within one or more files of a file storage system, where each file may or may not be indexed for information searching purposes. Further, data stores 120 and/or 140 can utilize one or more encryption mechanisms to protect stored information from unauthorized access.

Network 130 can include any hardware/software/and firmware necessary to convey data encoded within carrier waves. Data can be contained within analog or digital signals and conveyed through data or voice channels. Network 130 can include local components and data pathways necessary for communications to be exchanged among computing device components and between integrated device components and peripheral devices. Network 130 can also include network equipment, such as routers, data lines, hubs, and intermediary servers which together for a data network, such as the Internet. Network 130 can also include circuit-based communication components and mobile communication components, such as telephony switches, modems, cellular communication towers, and the like. Network 130 can include line based and/or wireless communications pathways.

Figure 2:
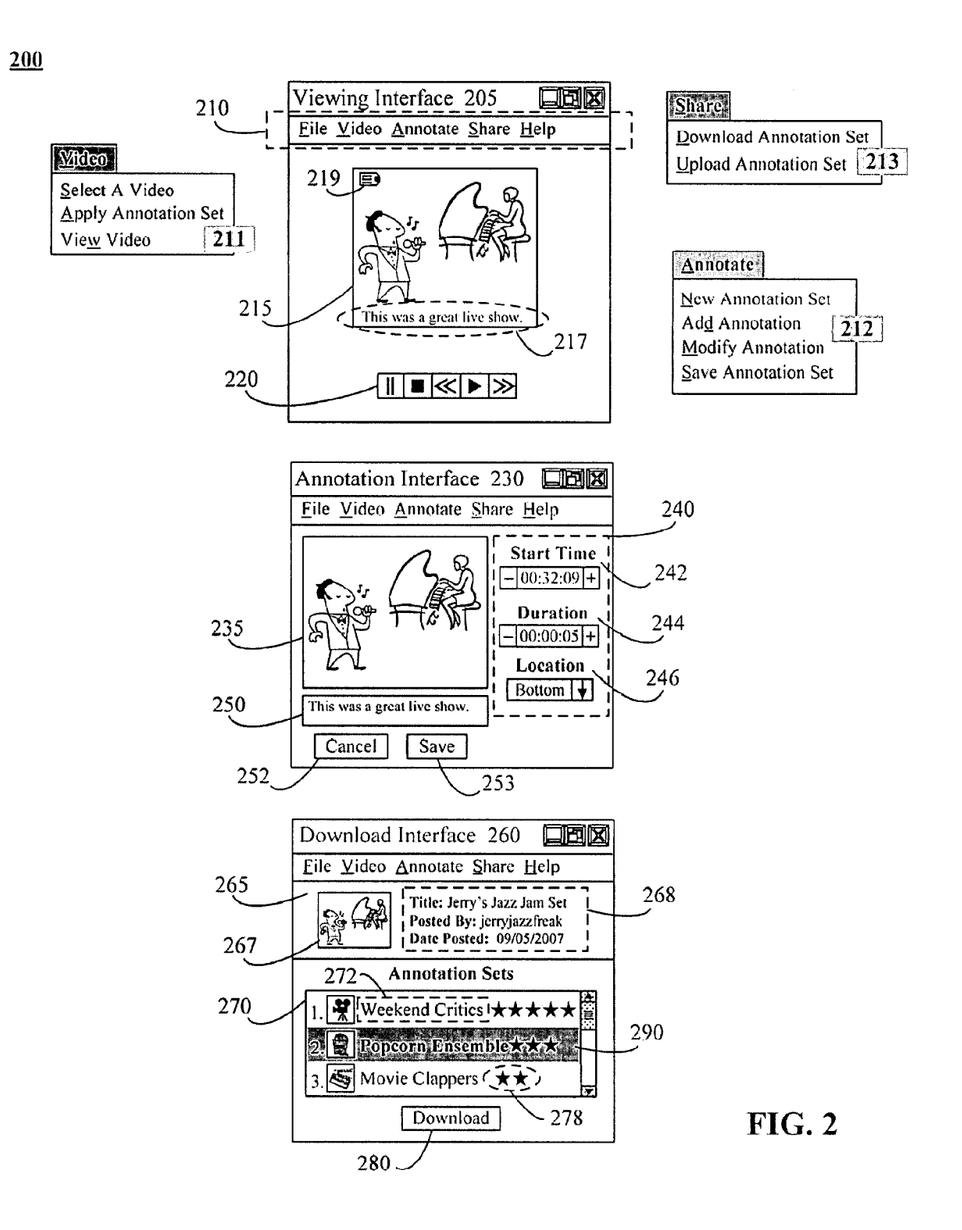
FIG. 2 is a collection of graphical user interfaces (GUIs) illustrating various user interfaces that can be used to capture and present user-created textual annotations while playing a video recording an accordance with an embodiment of the inventive arrangements disclosed herein.

FIG. 2 is a collection 200 of graphical user interfaces (GUIs) 205, 230, and 260 illustrating various user interfaces that can be used to capture and present user-created textual annotations while playing a video recording in accordance with an embodiment of the inventive arrangements disclosed herein. The interfaces of collection 200 can be used within the context of system 100. It should be noted that the interfaces of collection 200 are for illustrative purposes only and are not meant as a definitive implementations.

Interface 205 can be used for playing a video recording and associated textual annotations. The viewing interface 205 can be a separate video playing application, as shown in system 100, or can be integrated component if the annotation interface 230. The elements of the viewing interface 205 can include a menu tool bar 210, a viewing space 215, and player controls 220.

The menu toolbar 210 can be an interface element to allow a user to execute commands. Menus 211, 212, and 213 can exemplify commands used to invoke functions of the annotation interface 230 or communicate with a remote annotation server.

The viewing space 215 can display the video recording as well as the contents of an associated textual annotation 217. Additionally, an annotation indicator 219 can be displayed in the viewing space 215 to alert a user to the existence of annotations for the video recording.

The player controls 220 can represent a mechanism by which a user can modify the playing of a video recording. Typical player controls 220 can include stopping the playing of the video, playing the video, reversing the play of the video, forwarding the play of the video, pausing the play of the video, and the like. In another embodiment, the player controls 220 can be elements of an external component like a remote control.

The annotation interface 230 can be an interface by which a user adds textual annotations and/or modifies existing textual annotations. The annotation interface 230 can be invoked from the viewing interface 205 and/or through means conventional to a software application, such as doubling clicking a shortcut.

Elements of the annotation interface 230 can include a video viewing area 235, a placement data area 240, an annotation entry area 250, a cancellation button 252, and a save button 253. The video viewing area 235 can be a portion of the annotation interface 230 that can display the frame of the video that was being played when the interface 230 was invoked.

In the case where the annotation interface 230 was not invoked from the viewing interface 205, then the video viewing area 235 can be blank. It should be noted that the video viewing area 235 of the annotation interface 230 is not equivalent to the viewing space 215 if the viewing interface 205. The video viewing area 235 can be meant merely as a visual reminder of the scene of the video where the user is adding and/or modifying an annotation.

The placement data area 240 can be a section of the annotation interface 230 where a user can add and/or modify placement data for an annotation. Placement data entered in the placement data area 240 can include a start time 242, a duration 244, and a location 246. These data elements 240, 242, and 246 can be stored in an annotation set associated with textual annotation as shown in FIG. 1.

Entry of the placement data can include a variety of mechanisms, including, but not limited to, a pull-down list, a text field, a radio button, a checkbox, and the like. The placement data area 240 can include a different entry mechanism for each data element. Further, it should be noted that the entry mechanisms used need to be supported by the annotation interface 230 as well as the device running the interface 230.

The annotation entry area 250 can be a section of the interface 230 where the user can enter the textual annotation for the scene displayed in the video viewing area 235. Text entry into the annotation entry area 250 can be achieved by a variety of means that are supported by the annotation interface 230 as well as the device running the interface 230.

The cancellation button 252 can be a mechanism by which a user can terminate the invocation of the annotation interface 230. For example, a user may decide that the no longer wish to enter or modify the textual annotation and can use the cancellation button 252 to exit the interface 230.

The save button 253 can be a mechanism by which a user can store the annotation data currently displayed in the interface 230. The data can be saved in a location such as the local data store 120 of system 100.

Interface 260 can represent an interface where a user can download annotation data from a remotely-located server. The download interface 260 can include a video information area 265, an annotation set display area 270, and a download button 280.

When a user selects a video that they want an annotation set for, information about the video can be displayed in the video information area 265. The video information area 265 can include a still frame 267 from the video and a details area 268. As shown, in this example, the details area 268 can include information about the video, such as its title, author, and date it was posted to the site.

The annotation set display area 270 can provide a listing of the user-created annotation sets available for the video. Information presented within the annotation set display area 270 can include a creator identifier 272 and user-rating 278.

The creator identifier 272 can be a unique label associated with a specific user like a username for the annotation server. The user-rating 278 can an average of all received user-ratings for the annotation set that express the quality of the annotations contained within the set. Such features can be found in many existing online sharing Web sites and can be adapted for use with annotation set sharing.

The download button 280 can be the mechanism by which a user can initiate the retrieval of a copy of a selected annotation set, shown by the gray area 290 surrounding the annotation set.

Figure 3:
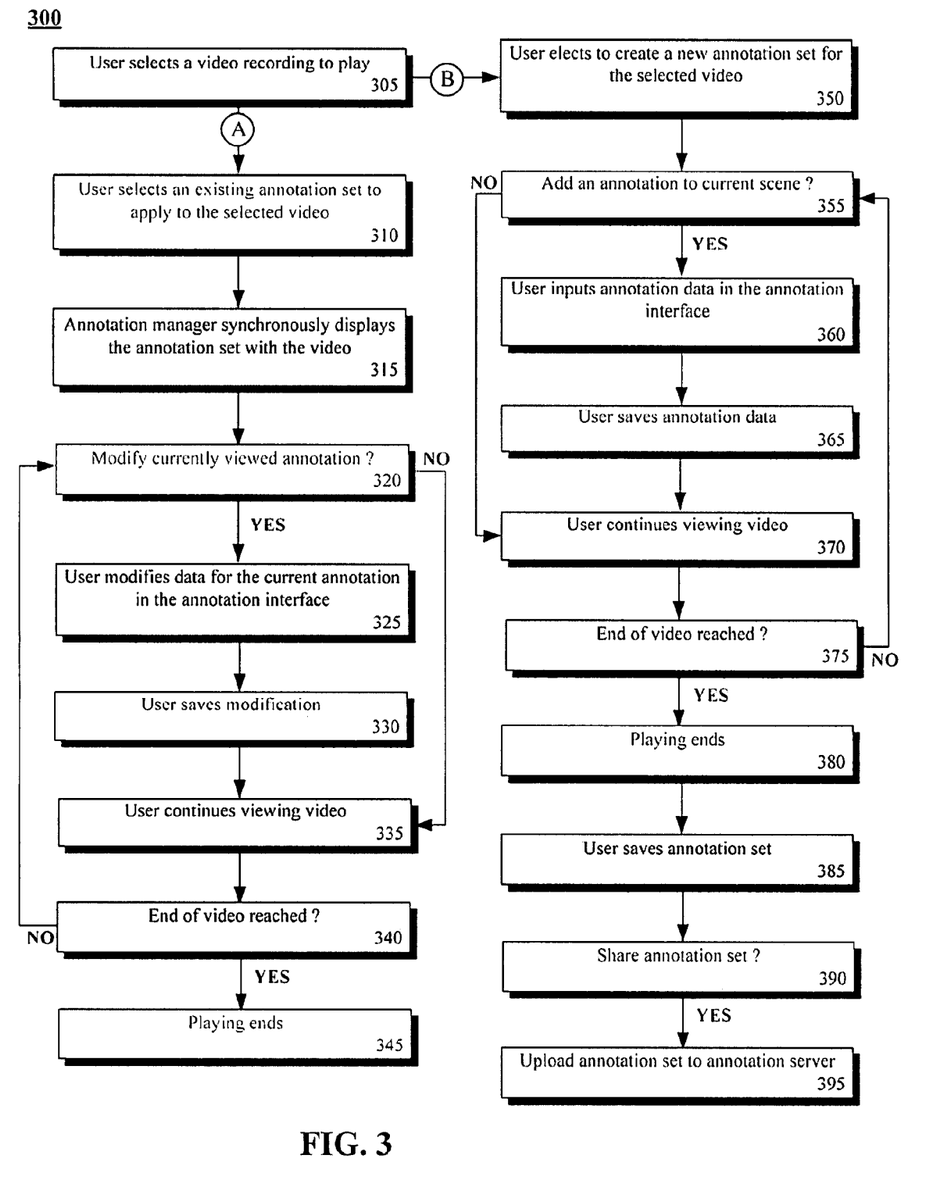
FIG. 3 is a split-path flow chart of a method describing how a user can interact with a user-created annotation set while playing a video recording in accordance with an embodiment of the inventive arrangements disclosed herein.

FIG. 3 is a split-path flow chart of a method 300 describing how a user can interact with a user-created annotation set while playing a video recording in accordance with an embodiment if the inventive arrangements disclosed herein. Method 300 can be performed in the context of system 100 or any other system for capturing and presenting user created textual annotations while playing a video recording. Method 300 can also utilize any or all of the interfaces illustrated in FIG. 2.

Method 300 can begin with step 305 where a user can select a video recording to play. From step 305 method 300 can split into two parallel flows, labeled A and B. Selection of path A or B can depend on whether the user wants to apply an existing annotation set to the video recording, path A, or create a new annotation set for the video recording, path B.

Following path A, the user can select an existing annotation set to apply to the video recording in step 310. After this selection, step 315 can execute in which the annotation manager can synchronously display the annotation set with the video recording.

In step 315, the user can decide whether to modify the currently viewed annotation. When the user desires to modify the current annotations step 325 call execute in which the user can modify the data for the annotation in the annotation interface. In step 330, the user can save the modification to the annotation.

The user can continue to view the video in step 335. Step 335 can also execute after step 320 when the user does not desire to modify the current annotation. In step 340, it can be determined if the end of the video recording has been reached. When the end of the video is reached, the playing of the video can end in step 345. Otherwise, the flow of path A returns to step 320 where it continues to loop through steps 320 through 340 until the end of the video is reached or the flow is terminated by outside means.

Following path B, after the selection of the video recording in step 305, flow can proceed to step 350 where the user can create a new annotation set for the video. In step 355, the user can decide whether to add an annotation to the currently displayed scene.

When the user decides to add and annotation, step 360 can execute where the user can input the annotation data into the annotation interface. In step 365, the user can save the annotation data input in step 360. The user can then continue to view the video in step 370. Step 370 can also execute after step 355 when the user does not decide to an annotation.

In step 375, it can be determined if the end of the video recording has been reached. When the end of the video is reached, the playing of the video end in step 380. Otherwise, the flow of the path B returns to step 355 where it continues to loop through steps 355 through 375 until the end of the video is reached or the flow is terminated by outside means.

Once playing ends in step 380, the user can save the created annotation set in step 385. In step 390, the user can decide whether to share the created annotation with others. When the user decides to share the annotation set, step 395 can execute where the user can upload the annotation set to an annotation server.

Figure 4:
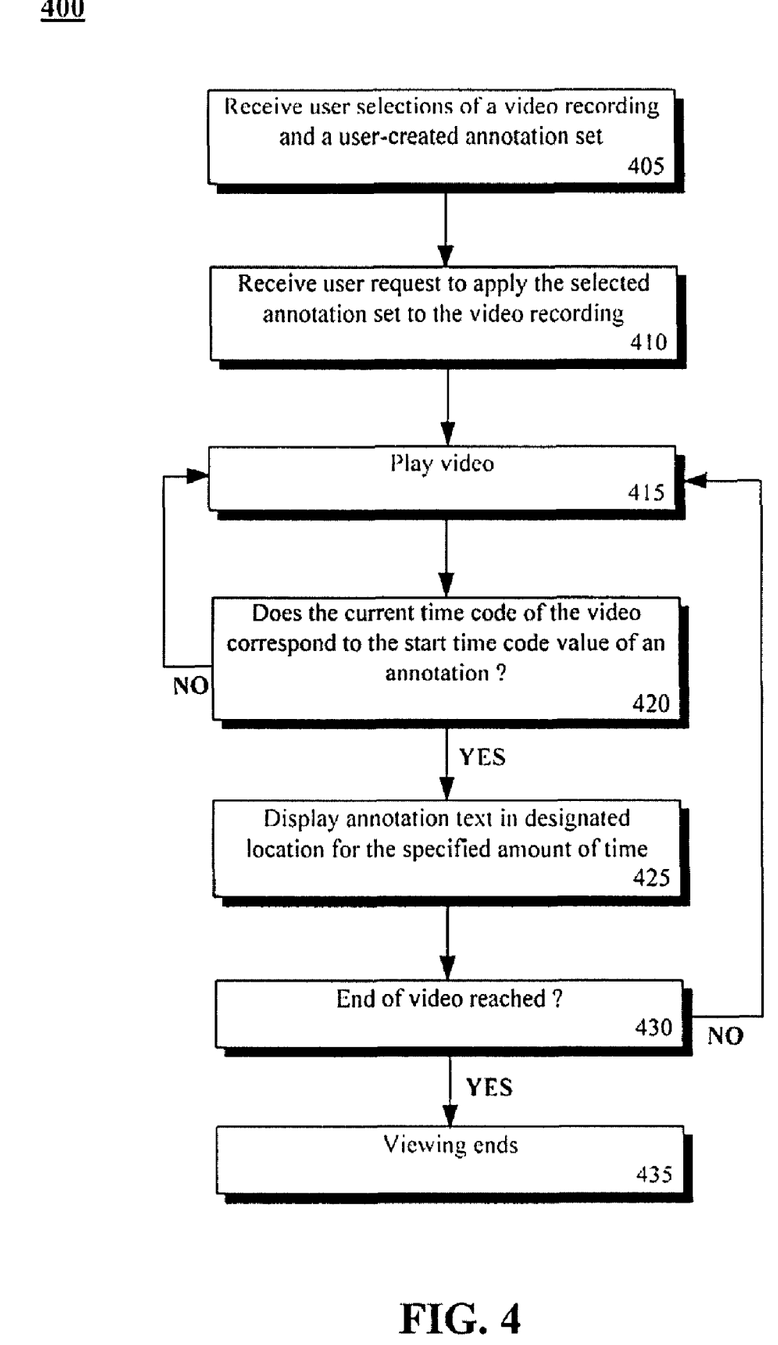
FIG. 4 is a flow chart of a method describing the synchronous display of a user-created annotation set while playing a video recording in accordance with an embodiment of the inventive arrangements disclosed herein.

FIG. 4 is a flow chart of a method 400 describing the synchronous display of a user-created annotation set while playing recording in accordance with an embodiment of the inventive arrangements disclosed herein. Method 400 can be performed within the context of system 100 and/or utilize any or all of the interfaces illustrated in FIG. 2.

Method 400 can begin in step 405 where the system receives user selections of a video recording and a user-created annotation set. In step 410, the system can receive a user request to apply the selected annotation set to the video recording. These selections and requests can be input by a user via an annotation interface and/or video playing application.

The video can begin to play in step 415. In step 420, the system can determine if the current time code of the video recording corresponds to the start time code of an annotation in the selected annotation set. When a correspondence is not found, flow can return to step 415 where the video continues to play.

When the current time code value of the video corresponds to the start time code of an annotation, step 425 can execute where the annotation text is displayed in its designated location for its specified amount of time. In step 430, it can be determined if the end of the video recording has been reached.

When the end of the video is reached, the playing of the video can end in step 435. Otherwise, flow can return to step 415 where it continues to loop through steps 415 through 430 until the end of the video is reached or the flow is terminated by outside means.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which compromises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributed thereof. Accordingly, reference should be made to the following claims, rather than to the foregoing specification, as indicating the scope of the invention.

What is claimed is:

1. A textual annotation system for video recordings implemented comprising:
   a video recording file;
   an annotation interface, implemented in computing equipment, accepts and executes a set of user-selectable commands for a user-created annotation set, wherein the user-created annotation set contains a plurality of textual annotations and associated placement data, wherein each textual annotation corresponds to a specified time segment of the video recording, and wherein the placement data associated with a textual annotation of the annotation set includes a display location defining an area within the shared viewing space to display the textual annotation, a start time code corresponding to a time code value associated with a frame of the video recording file at which to begin displaying the textual annotation, and a duration value defining a length of time to display the textual annotation in the display location; and
   an annotation manager, implemented in computing equipment, that displays the user-created annotation set synchronously with the video recording file within a viewing space in real-time, wherein the video recording file contents are unaltered, and wherein the annotation manager is further compares a time code value corresponding to a frame of the video recording file that is currently displayed with the start time code value and, when the time code value of the frame matches the start time code for a textual annotation within the annotation set, displays the textual annotation at the defined display location for an amount of time equal to the duration value.

2. The system of claim 1, wherein the set of user-selectable commands available within the annotation interface includes one or more of an add annotation command, a delete annotation command, a modify annotation command, a save annotation command, a create new annotation set command, a save annotation set command, an upload annotation set command, a download annotation set command, and an apply annotation set command.

3. The system of claim 1, wherein the annotation manager repeatedly compares the time code value corresponding to frames of the video recording and displays textual annotation at the defined display location for an amount of time equal to the duration value until the video recording file ends.

4. The system of claim 1, further comprising:
   a video playing application configured to display the video recording file, wherein the video playing application includes a mechanism by which to invoke the annotation interface, and wherein a display area of the video playing application represents the viewing space.

5. The system of claim 1, wherein the annotation interface further comprises:
   a viewing interface configured to contain the viewing space and display the video recording file in the viewing space.

6. The system of claim 1, wherein the annotation interface further comprises:
   an input mechanism configured to capture a textual annotation and placement data for the annotation set.

7. The system of claim 1, wherein the user-created annotation set is located in a data store of a remotely located server.

8. The system of claim 1, further comprising:
   a local data store accessible by the annotation manager and annotation interface and configured to store the annotation set and video recording file.

9. The system of claim 1, wherein the video recording file is located in a data store of a remotely located server.

10. The system of claim 1, wherein a resource-constrained runtime environment operates on a portable computing device, wherein the portable computing device is one of a mobile phone, a personal data assistant, and a portable gaming unit.

11. A method for presenting user-created textual annotations while playing a video recording comprising:
    receiving a user selection of a video recording;
    receiving a user selection of a user-created annotation set, wherein the user-created annotation set contains a plurality of textual annotations and associated placement data, wherein each textual annotation corresponds to a specified time segment of the video recording, and wherein the placement data associated with a textual annotation of the annotation set includes a display location defining an area within the shared viewing space to display the textual annotation, a start time code corresponding to a time code value associated with a frame of the video recording file at which to begin displaying the textual annotation, and a duration value defining a length of time to display the textual annotation in the display location;
    receiving a user request to apply the user-created annotation set to the selected video recording;
    synchronously displaying the user-created annotation set with the video recording in a shared viewing space, and
    comparing a time code value corresponding to a frame of the video recording that is currently displayed with the start time code value and, when the time code value of the frame matches the start time code for a textual annotation within the annotation set, displaying the textual annotation at the defined display location for an amount of time equal to the duration value.

12. The method of claim 11, wherein the comparing step and displaying step, when necessary, are repeated until the displaying step terminates.

13. The method of claim 11, the user selection of the annotation set further comprises:
    accessing a data store of a remotely located annotation server, wherein the data store contains one or more user-created annotation sets corresponding to the video recording;
    selecting one of the one or more of user-created annotation sets, wherein a basis of the selection is a user-rating of the user-created annotation set; and
    downloading the selected annotation set from the data store, wherein a copy of the selected annotation set is stored in a local data store.

14. The method of claim 11, further comprising:
    receiving a user-modification to at least one of a textual annotation and placement data of a textual annotation within the user-created annotation set;
    saving the user-modification to a local data store; and automatically displaying the user-modification synchronously with the video recording.

15. The method of claim 11, wherein said steps of claim 11 are performed by at least one machine in accordance with at least one computer program stored in a computer readable media, said computer programming having a plurality of code sections that are executable by the at least one machine.

16. A video serving system, comprising:
a video annotation server implemented with computer equipment that provides access to a data store containing a plurality of user-created annotation sets and a plurality of annotated video files, wherein each user-created annotation set contains at least one textual annotation and associated placement data associated with an annotated video file, wherein the placement data includes a display location defining an area within a viewing space to display the textual annotation, a start time code corresponding to a time code value associated with a frame of the annotated video file at which to begin displaying the textual annotation, and a duration value defining a length of time to display the textual annotation in the display location; and
computing equipment including a video annotation application configured to create, modify, view, and convey user-created annotation sets, wherein the video annotation server serves the annotated video files to a plurality of clients, which are configured to view the served and annotated video files within one of a browser and a Rich Internet Interface, and wherein, for each annotated video served, the video annotation application further compares a time code value corresponding to a frame of the annotated with the start time code value, and, when the time code value of the frame matches the start time code for a textual annotation within the annotation set, visually includes the textual annotation at the defined display location in the annotated video for an amount of time equal to the duration value.

17. The system of claim 16, wherein the video annotation server provides a video annotation interface that allows clients to create the user defined annotation sets via the video annotation application.

18. The system of 16, wherein the video annotation application repeatedly compares the time code value corresponding to frames of the video recording and displays textual annotation at the defined display location for an amount of time equal to the duration value until the annotated video file ends.

* * * * *